(12) United States Patent
Hohl et al.

(10) Patent No.: US 11,481,087 B2
(45) Date of Patent: Oct. 25, 2022

(54) ELECTRONIC DEVICE AND METHOD FOR IDENTIFYING INPUT COMMANDS OF A USER

(71) Applicant: SONY CORPORATION, Tokyo (JP)

(72) Inventors: Fritz Hohl, Stuttgart (DE); Stefan Uhlich, Renningen (DE); Wilhelm Hagg, Korb (DE); Thomas Kemp, Esslingen (DE)

(73) Assignee: SONY CORPORATION, Tokyo (JP)

( * ) Notice: Subject to any disclaimer, the term of this patent is extended or adjusted under 35 U.S.C. 154(b) by 570 days.

(21) Appl. No.: 15/124,579

(22) PCT Filed: Mar. 18, 2015

(86) PCT No.: PCT/EP2015/055728
§ 371 (c)(1),
(2) Date: Sep. 8, 2016

(87) PCT Pub. No.: WO2015/144536
PCT Pub. Date: Oct. 1, 2015

(65) Prior Publication Data
US 2017/0017357 A1    Jan. 19, 2017

(30) Foreign Application Priority Data
Mar. 27, 2014 (EP) .................................... 14161982

(51) Int. Cl.
*G06F 17/00* (2019.01)
*G06F 3/0482* (2013.01)
(Continued)

(52) U.S. Cl.
CPC ............ *G06F 3/0482* (2013.01); *G06F 3/048* (2013.01); *G06F 3/04817* (2013.01);
(Continued)

(58) Field of Classification Search
CPC .... G06F 3/0482; G06F 3/04817; G06F 3/167; G06F 3/048; G10L 15/22; G10L 15/26
(Continued)

(56) References Cited

U.S. PATENT DOCUMENTS 6,253,176 B1 * 6/2001 Janek ...................... G10L 15/22
704/231
6,731,309 B1    5/2004 Unbedacht et al.
(Continued)

FOREIGN PATENT DOCUMENTS

EP    2 677 518 A2    12/2013

OTHER PUBLICATIONS

Jian, 'An Interactive Interface between Human and Computer based on Pattern and Speech Recognition', 2012 International Conference on Systems and Informatics ICSAI2012 (Year: 2012).*
(Continued)

*Primary Examiner* — Wilson W Tsui
*Assistant Examiner* — Matthew J Ludwig
(74) *Attorney, Agent, or Firm* — Xsensus LLP (57) ABSTRACT

An electronic device, including an input interface configured to receive an input signal, a command determination unit configured to determine a plurality of possible commands based on the input signal, and an output interface configured to provide a plurality of output information corresponding to effects associated with each of the plurality of determined possible commands.

12 Claims, 5 Drawing Sheets

(51) Int. Cl.
*G06F 3/16* (2006.01)
*G06F 3/048* (2013.01)
*G10L 15/22* (2006.01)
*G10L 15/26* (2006.01)
*G06F 3/04817* (2022.01)

(52) U.S. Cl.
CPC .............. *G06F 3/167* (2013.01); *G10L 15/22* (2013.01); *G10L 15/26* (2013.01); *G10L 2015/223* (2013.01)

(58) Field of Classification Search
USPC .................. 715/265, 701, 729, 825, 822
See application file for complete search history.

(56) References Cited

U.S. PATENT DOCUMENTS

| | | | | |
|---|---|---|---|---|
| 7,792,671 | B2* | 9/2010 | Brand | G06K 9/03 704/240 |
| 7,805,300 | B2* | 9/2010 | Gorin | G10L 15/18 704/245 |
| 7,983,914 | B2* | 7/2011 | Eckhart | G10L 15/063 704/243 |
| 8,947,241 | B2* | 2/2015 | Trenkle | A01K 15/021 340/573.3 |
| 9,431,008 | B2* | 8/2016 | Robichaud | G10L 15/22 |
| 9,589,561 | B2* | 3/2017 | Choi | G06F 3/0482 |
| 9,792,905 | B2* | 10/2017 | Gorin | G10L 15/183 |
| 2002/0184016 | A1* | 12/2002 | Hartley | G10L 15/08 704/235 |
| 2003/0117365 | A1* | 6/2003 | Shteyn | G10L 15/26 345/156 |
| 2003/0154077 | A1* | 8/2003 | Tahara | G10L 15/10 704/239 |
| 2004/0260562 | A1* | 12/2004 | Kujirai | G01C 21/3608 704/275 |
| 2005/0251754 | A1 | 11/2005 | Padgett et al. | |
| 2007/0088556 | A1* | 4/2007 | Andrew | G10L 15/19 704/270.1 |
| 2009/0077630 | A1* | 3/2009 | Kaihoko | G06F 21/34 726/2 |
| 2009/0091770 | A1* | 4/2009 | Kano | H04N 1/00132 358/1.1 |
| 2009/0306980 | A1* | 12/2009 | Shin | G06F 3/0488 704/235 |
| 2010/0025842 | A1* | 2/2010 | Yamamoto | H01L 24/12 257/692 |
| 2010/0312547 | A1* | 12/2010 | Van Os | G10L 15/26 704/9 |
| 2013/0024197 | A1* | 1/2013 | Jang | H04N 21/4345 704/246 |
| 2013/0115927 | A1* | 5/2013 | Gruber | G06Q 10/109 455/414.1 |
| 2013/0197914 | A1* | 8/2013 | Yelvington | G10L 15/22 704/E11.001 |
| 2013/0218572 | A1* | 8/2013 | Cho | G06F 3/167 704/275 |
| 2013/0325460 | A1* | 12/2013 | Kim | G10L 15/22 704/231 |
| 2013/0325469 | A1 | 12/2013 | Kim et al. | |
| 2013/0346077 | A1* | 12/2013 | Mengibar | G06F 16/211 704/235 |
| 2014/0191949 | A1* | 7/2014 | Park | G06F 3/167 345/156 |
| 2014/0278435 | A1* | 9/2014 | Ganong, III | G10L 15/22 704/275 |
| 2014/0280015 | A1* | 9/2014 | Marantz | G06F 16/1767 707/710 |
| 2015/0066479 | A1* | 3/2015 | Pasupalak | G06F 40/40 704/9 |
| 2015/0082175 | A1* | 3/2015 | Onohara | G06F 3/167 715/728 |
| 2015/0254058 | A1* | 9/2015 | Klein | G06F 3/167 704/275 |
| 2020/0005790 | A1* | 1/2020 | Bae | H03G 3/3005 |

OTHER PUBLICATIONS

Nucan, 'Dragon Speech Recognition', Nuance, 2014 Nuance Communications (Year: 2014).*
International Search Report and Written Opinion of the International Searching Authority dated Jun. 2, 2015 in PCT/EP15/55728 filed Mar. 18, 2015.
"Change your screen resolution" http://windows.microsoft.com/en-us/windows7/change-your-screen-resolution accessed from internet on Jul. 31, 2013 (4 pages).
Kovarova, "Special Interaction Approaches and their Impact on Usability" Information Sciences and Technologies Bulletin of the ACM Slovakia, vol. 3, No. 3, 2001 (pp. 14-25).

* cited by examiner

ELECTRONIC DEVICE AND METHOD FOR IDENTIFYING INPUT COMMANDS OF A USER

BACKGROUND

Field of the Disclosure

The present disclosure relates to a an electronic device, in particular for identifying commands from a user. The disclosure also relates to a method for identifying commands of a user interface, a computer program as well as a non-transitory computer-readable recording medium.

Description of Related Art

There is an increased demand for systems which react on user speech in-put in a graphical way in order to improve the input interfaces of electronic devices and the handling of electronic devices in general. In every speech input system recognition errors or ambiguities of the language lead to a multitude of possibilities what the user could have said and which input command is related to the received speech input.

In known speech input systems many solutions are known how to handle recognition errors and ambiguities of the language, wherein e.g. either the command which is deemed to be the most probable is executed, the system asks the user to repeat the command if the ambiguities are too large or the system presents the user a list of possibilities of commands associated with the speech input. Further, speech input systems are known which show a preview of the impact of the user command identified by the system.

The known methods for identifying the speech input have either the disadvantage that the wrong command might be executed, that the recognition errors occur a plurality of times if the command has to be repeated or the differences between the listed possibilities is low so that it is difficult for the user to distinguish the offered commands to be executed. Consequently, the known systems are either less reliable or complicated for the user.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide an electronic device for identifying commands from a user having a higher reliability and which is less complicated for the user. It is a further object to provide a method for identifying commands of a user having an improved reliability and which is less complicated for the user, as well as a corresponding computer program for implementing the method and a non-transitory computer-readable recording medium for implementing the method.

According to a further aspect there is provided an electronic device, comprising:
  an input interface configured to receive an input signal,
  a command determination unit configured to determine a plurality of possible commands on the basis of the input signal, and
  an output interface configured to provide a plurality of output information corresponding to effects associated with each of the plurality of determined possible commands.

According to an aspect there is provided a method for identifying commands of a user, comprising:
  receiving an input signal from a user,
  determining a plurality of possible commands on the basis of the input signal, and
  providing output information corresponding to effects associated with each of the plurality of determined possible commands.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed method, the claimed computer program and the claimed computer-readable recording medium have similar and/or identical preferred embodiments as the claimed device and as claimed in the dependent claims.

One aspect of the present disclosure is to identify the input signals received from an input interface and to determine a plurality of possible commands on the basis of the input signals. The actions, consequences, results or effects associated with the determined possible commands are provided to the user so that the user can easily distinguish the effects of the commands and easily choose which of the commands or actions shall be executed. Preferably, one of the possible commands is finally selected on the basis of a user input signal, which may be a manual or a speech input signal. Since the effects associated with the different possible commands are presented to the user, the reliability of the identification of the commands is increased and since the user also sees the impact of the command a rollback of the consequences due to executing wrong commands can be avoided. Further, since the consequences of the different possible commands are provided to the user the step of identifying the command can be skipped so that the method in general is less complicated for the user.

The different output information presented to the user are preferably displayed on a display unit so that the user can visually check the effect of the possible input command and the possible effects or results are displayed corresponding to a confidence parameter so that the actions corresponding to the most probable identified input commands can be highlighted and the use of the identification method is less complicated.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
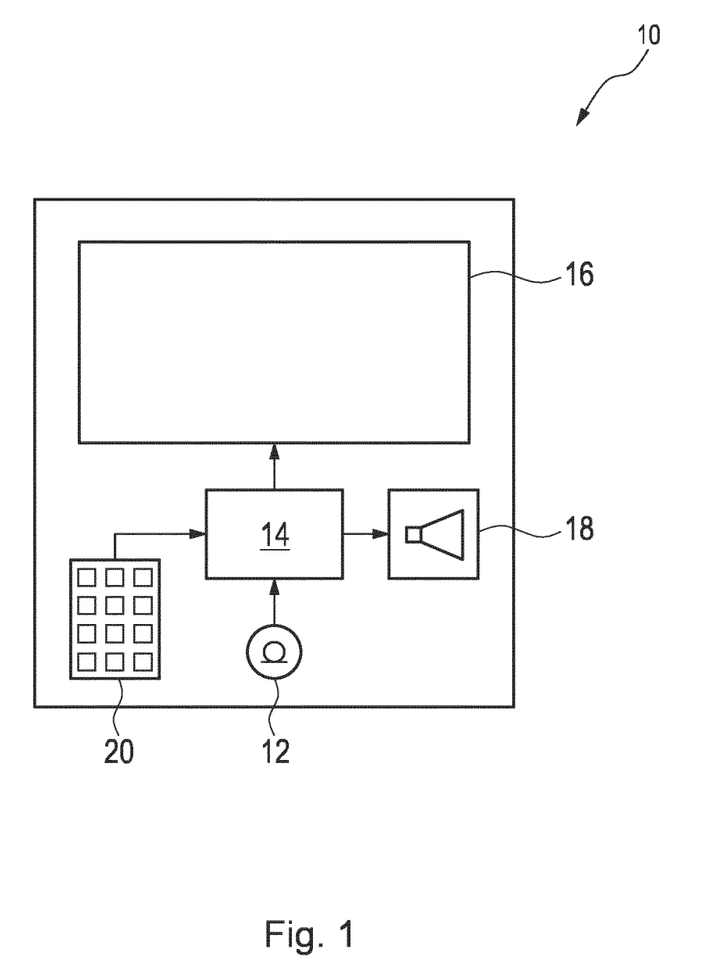
FIG. 1 shows a schematic block diagram of a user interface for identifying input commands from a user.

Referring now to the drawings, wherein like reference numerals designate identical or corresponding parts throughout the several views, FIG. 1 shows a schematic block diagram of an embodiment of a user interface for identifying speech input commands of a user which is generally denoted by 10. The user interface 10 may be a part of an electronic device like a smartphone, a tablet computer, an entertainment system, a computer in general, which can be controlled by speech commands of the user.

The user interface comprises a speech interface 12 for receiving speech commands of the user. The speech interface comprises a microphone for detecting the audio signal surrounding the user interface 10. The user interface 10 comprises a central processing unit 14, which is connected to the speech interface 12, wherein the audio signals received by the speech interface 12 are provided to the central processing unit 14 for speech detection. The central processing unit 14 detects the speech received from the speech interface 12 and determines a plurality of input commands which correspond to expressions identified from the speech received by the speech interface 12.

The central processing unit 14 determines effects, actions or results corresponding to the plurality of determined input commands and provides the effects or actions to output interfaces of the user interface 10 in general. One of the output interfaces is a display screen 16 which is provided for displaying information to the user. If the effects or actions corresponding to the input commands are related to visual actions, the central processing unit 14 displays the corresponding effect or action on the display screen 16 as described in the following. In the case that the effect or action is an audio signal, e.g. playing different music, the central processing unit 14 provides a corresponding signal to speakers 18 of the user interface 10 and provides the corresponding audio signals to the user.

On the basis of the effects or actions corresponding to the input commands determined from the speech input signal, the user can select one of the effects or actions by means of an input signal in general and the central processing unit 14 executes the corresponding effect or action selected by the user. The input signal may be provided to the central processing unit 14 by means of an input device 20 which can be formed as a keyboard or can be a speech signal received and determined by the speech interface 12.

By means of the user interface 10, the actions or effects corresponding to the plurality of input commands determined from the speech input signal received by the speech interface 12 can be easily provided to the user and the user can easily select the effect or action which was intended by the speech signal. Since the action and effect is provided to the user, the reliability of the interface is improved and the handling of the user interface is more comfortable.

Figure 2:
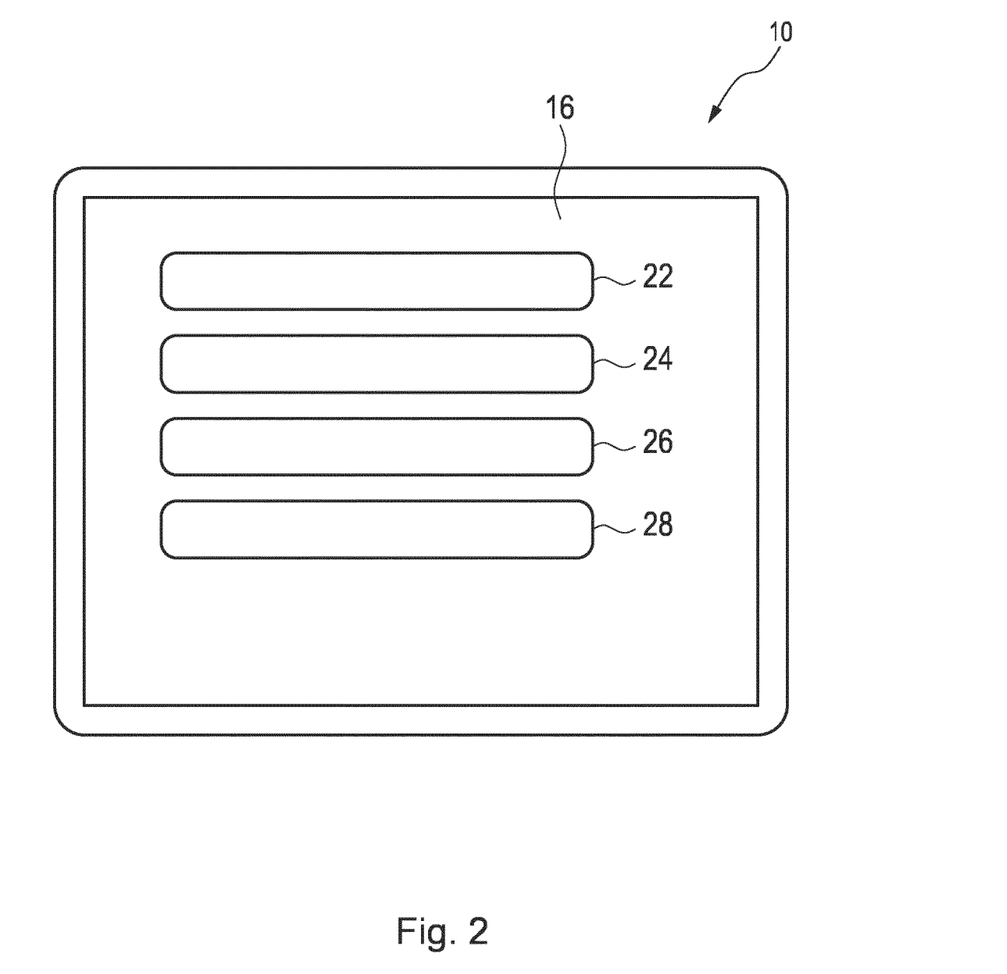
FIG. 2 shows an embodiment how to display output information corresponding to effects of the input commands.

FIG. 2 shows an embodiment how to display the different effects or actions corresponding to the determined input commands. The effects or actions are displayed on the display screen 16 of the user interface 10. In FIG. 2, the effects or action determined from the different input commands are denoted by 22, 24, 26, 28. The effects or actions 22-28 are in this embodiment provided spaced apart from each other as a list. The central processing unit 14 is designed to determine a confidence value for each of the determined input commands. The confidence value corresponds to a correlation of the input command to the detected speech signal and forms a probability that the input command has been correctly determined on the basis of the speech signal on the basis of either the speech signal or the usage context or both. The effects or actions 22-28 displayed on the display screen 16 as shown in FIG. 2 are listed in the order corresponding to the confidence value so that e.g. the most probable effect or action 22 is listed at the top of the display screen 16.

Figure 3:
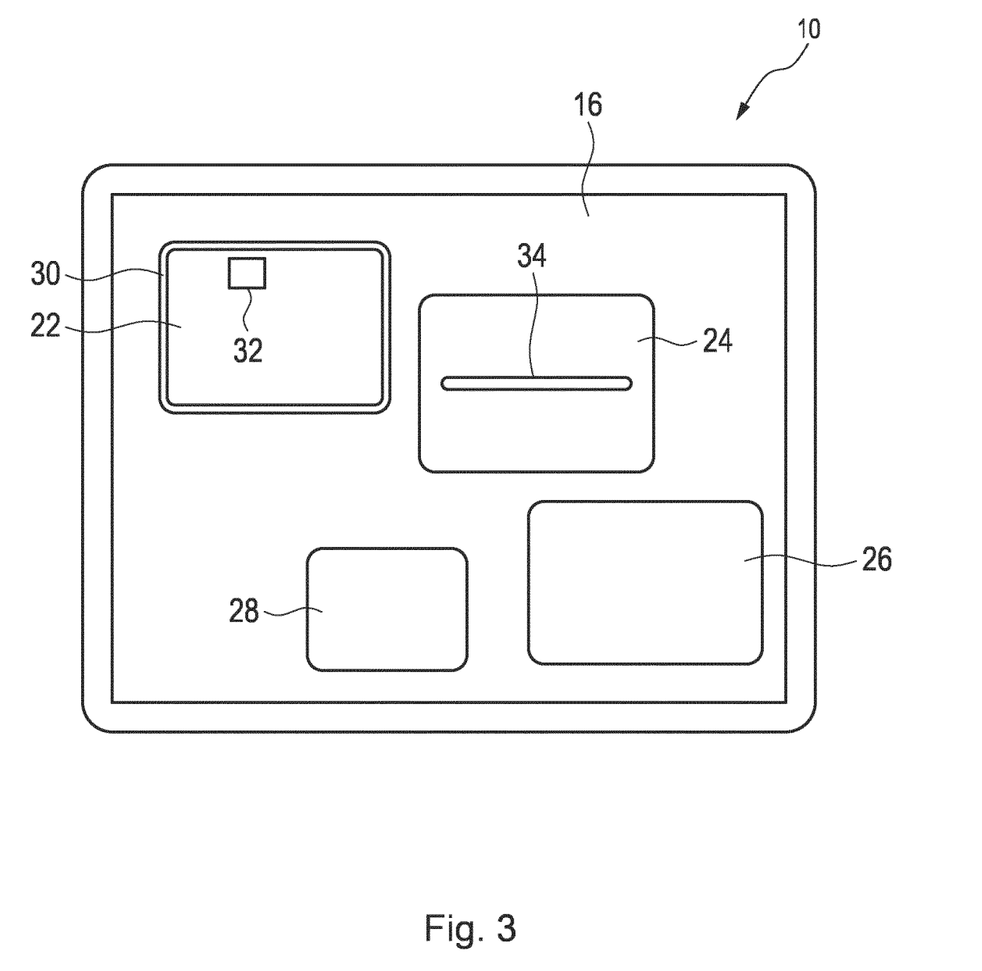
FIG. 3 shows an alternative embodiment to display the output information.

FIG. 3 shows an alternative presentation of the effects or actions 22-28 which represent the result of the input commands determined from the speech signal. The effects or actions 22-28 are displayed as images or pictures spaced apart from each other, wherein the images or pictures show the commands' result as e.g. a snapshot of the desktop surface or a snapshot of the program or application surface or window which is related to the respective input command. Depending on the determined confidence value, the pictures corresponding to the effects or actions 22-28 are disposed on the display screen 16 and the most probable may be highlighted by a colored frame or circle 30 as shown for effect or action 22.

Within the images or pictures of the effects or actions 22-28 showing a snapshot of the desktop or a program or application surface or window, the result of the input command may be highlighted in order to show the result of the input command explicitly. For example if the deletion of an icon on the desktop is the result of the command, the respective location of the removed icon is highlighted by e.g. a colored circle or if the result would be the deletion of an e-mail in an e-mail program, the removed e-mail may be highlighted in the list of e-mails by a respective colored frame or circle 32, 34 as shown as an example in FIG. 3. Hence, the user can select the intended command faster with less mental effort since the user immediately sees whether the input command executes the intended action 22, 28 or not.

The user can select the so-displayed effects or actions 22-28 by a manual input signal via the input unit 20 or by a speech input command e.g. by spelling a number of the respectively displayed effect or action 22-28.

Figure 4:
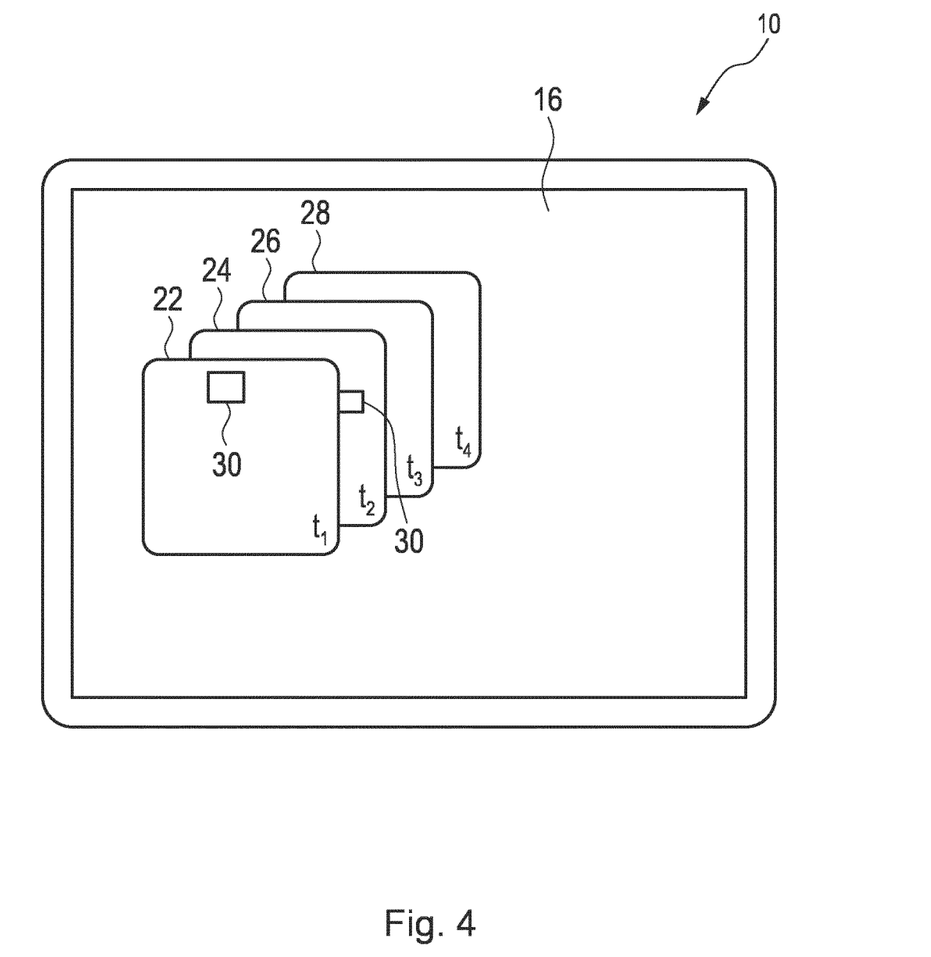
FIG. 4 shows a further alternative embodiment to display the output information in a time-dependent manner.

FIG. 4 shows an alternative display mode for displaying the effects or actions 22-28. The effects or actions 22-28 are visually displayed as described before e.g. as a picture corresponding to a snapshot of the desktop or the program, wherein in this certain embodiment the effects or actions 22-28 are displayed in a time-based manner $t_1$, $t_2$, $t_3$, $t_4$. The respective effects or actions 22-28 are displayed consecutive one after the other so that the user can select the effect or action 22-28 if the intended result is displayed. In this certain embodiment the effects or actions 22-28 are displayed preferably in sequence $t_1$, $t_2$, $t_3$, $t_4$ a row dependent on the confidence value so that the most probable effect or action 22 is displayed first and the respective effects or actions 24-28 having lower confidence values are displayed later. The time-based displaying of the effects or actions 22-28 i.e. the switching from one to the other may be automatically or triggered by an input signal of the user.

If the respective effect or action 22-28 is displayed, the user can select the effect or action 22-28 by means of a manual input via the input device or by a speech input signal received by the voice interface 12.

Figure 5:
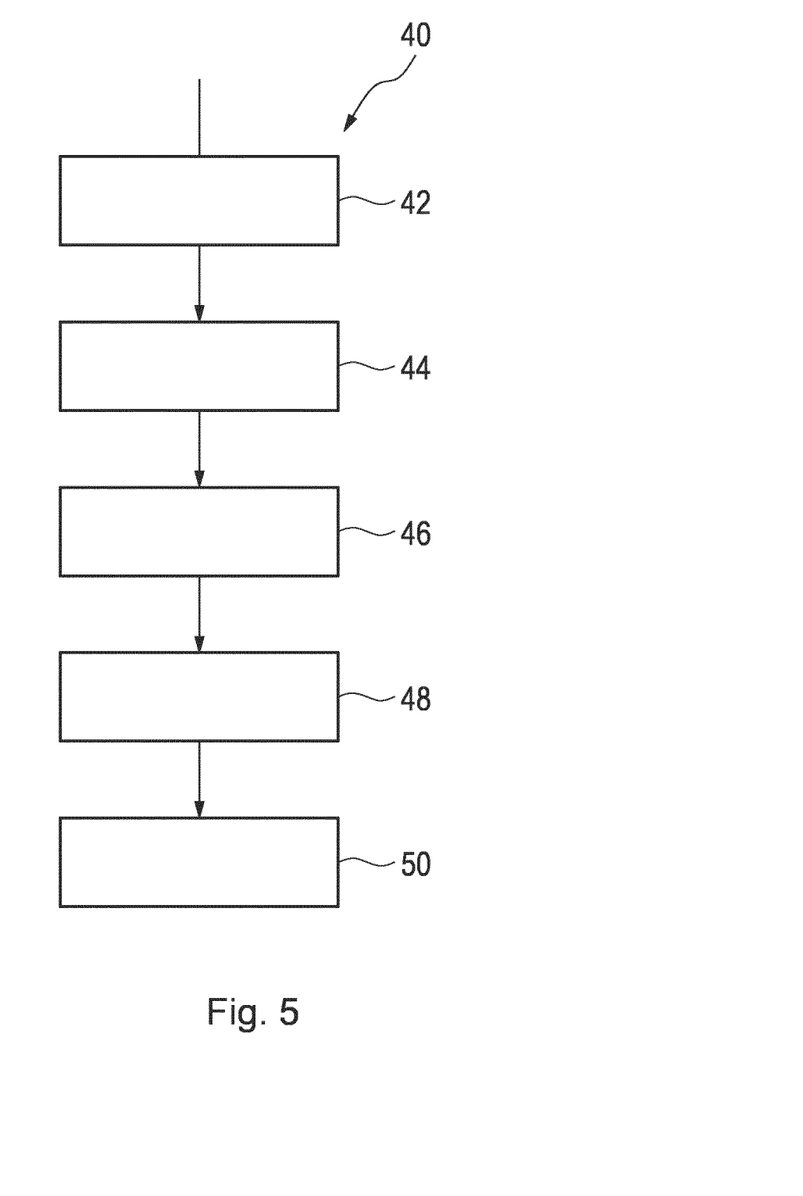
FIG. 5 shows a schematic flow diagram of a method for identifying input commands of a user interface.

In FIG. 5 a schematic flow diagram of a method for identifying the input commands of a user interface 10 is schematically shown and generally denoted by 40. The method starts with receiving of a speech input signal of the user via the voice interface 12 as shown at step 42. After receiving the speech signal, the central processing unit 14 determines a plurality of different possible input commands on the basis of the received speech input signal as shown at 44. On the basis of the determined different possible input commands the associated effects or actions 22-28 are determined and provided as different output information to the user as shown at 46. After providing the output information to the user, the central processing unit 14 selects one of the determined plurality of possible input commands on the basis of a user input signal as shown at 48. The user input signal may be a manual input or a speech input signal. Finally at the step 50, the selected input command is executed by the central processing unit 14.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Any reference signs in the claims should not be construed as limiting the scope.

It follows a list of further embodiments of the disclosed subject matter:

1. An electronic device is disclosed, in particular for identifying commands from a user, comprising: an input interface configured to receive an input signal, a command determination unit configured to determine a plurality of possible commands on the basis of the input signal, and an output interface configured to provide a plurality of output information corresponding to effects associated with each of the plurality of determined possible commands.

2. The electronic device according to embodiment 1, wherein the output interface is a display screen configured to visually display the output information.

3. The electronic device according to embodiment 2, wherein the display screen is configured to display the output information corresponding to the effects associated with each of the commands spaced apart from each other.

4. The electronic device according to embodiment 2 or 3, wherein the display screen is configured to display the output information corresponding to the effects associated with each of the commands consecutively in a time-dependent manner.

5. The electronic device according to embodiment 3 or 4, wherein a confidence parameter is determined on the basis of a correlation of the input signal and each of the determined possible commands, and wherein the display screen is configured to display the output information corresponding to the respective confidence parameter.

6. The electronic device according to embodiment 5, wherein the display screen is configured to display the output information spaced apart or in the time-dependent manner on the basis of the confidence parameter.

7. The electronic device according to any embodiment 3 to 6, wherein the display screen is configured to highlight the output information on the display screen.

8. The electronic device according to embodiment 5 to 7, wherein the display screen is configured to adapt a size of the displayed output information on the basis of the confidence parameter.

9. The electronic device according any preceding embodiment, further comprising a selection unit configured to select one of the plurality of possible commands on the basis of a user input signal.

10. The electronic device according any preceding embodiment, wherein the command determination unit is configured to determine different input commands as the plurality of possible commands.

11. The electronic device according any preceding embodiment, further comprising an audio interface configured to output the output information as an audio signal.

12. The electronic device according any preceding embodiment, further comprising a speech input interface configured to receive speech from a user as the input signal.

13. The electronic device according to embodiment 9, wherein the user input signal is a speech input signal.

14. The electronic device according to embodiment 9, wherein the user input signal is a manual input signal.

15. A method is disclosed for identifying commands of a user interface, comprising: receiving an input signal from a user, determining a plurality of possible commands on the basis of the input signal, and providing output information corresponding to effects associated with each of the plurality of determined possible commands.

16. The method according to embodiment 15, wherein the input signal is a speech signal from the user received from a speech input interface.

17. A computer program is disclosed comprising program code means for causing a computer to perform the steps of said method according to embodiment 15 when said computer program is carried out on a computer.

18. A non-transitory computer-readable recording medium that stores therein a computer program product, which, when executed by a processor, causes the method according to embodiment 15 to be performed.

The invention claimed is:

1. An electronic device, comprising:
 an input interface configured to receive an input signal comprising speech from a user;
 processing circuitry;
 command determination circuitry configured to:
   determine a plurality of possible input commands based on the input signal;

generate a confidence value for each of the determined input commands based on a correlation of each of the possible input command to the received speech;

determine a plurality of actions and results, each of which corresponds to a respective one of the plurality of possible input commands; and generate and assign an image for each of the plurality of input commands, wherein each image is generated by capturing the respective action and result;

an output interface including a screen configured to display the generated images in an ordered time-based manner, wherein the order of each of the images corresponds to the generated confidence value of its assigned possible input commands; and selection circuitry configured to select one of the plurality of possible input commands corresponding to the displayed images in response to which have been displayed on the basis of a second input signal comprising additional speech from the user.

2. The electronic device as claimed in claim 1, wherein the output interface displays a highlighted output information which represents a result of execution of a particular one of the plurality of possible input commands which is a most probable possible command.

3. The electronic device as claimed in claim 2, wherein the display screen is configured to display the output information corresponding to the effects associated with each of the plurality of possible input commands spaced apart from each other.

4. The electronic device as claimed in claim 3, wherein a plurality of confidence parameters are determined based on a correlation of the input signal and each of the determined possible commands, and wherein the display screen is configured to display the output information corresponding to the respective confidence parameter.

5. The electronic device as claimed in claim 4, wherein the display screen is configured to adapt a size of the displayed plurality of output information on the basis of the respective confidence parameter.

6. The electronic device as claimed in claim 3, wherein the display screen is configured to highlight the output information on the display screen.

7. The electronic device as claimed in claim 1, wherein the command determination circuitry is configured to determine different input commands as the plurality of possible commands.

8. The electronic device as claimed in claim 1, further comprising an audio interface configured to output the output information as an audio signal.

9. The electronic device as claimed in claim 1, further comprising a speech input interface configured to receive the speech from the user as the input signal.

10. The electronic device as claimed in claim 1, wherein the pictures correspond to effects or actions to be taken when selected by a user.

11. A method for identifying commands of a user, comprising:

receiving an input signal comprising speech from a user;

determining a plurality of possible input commands based on the input signal;

generating a confidence value for each of the determined commands based on a correlation of each of the possible input command to the received speech;

determining a plurality of actions and results each of which corresponds to a respective one of the plurality of possible input commands;

generating and assign an image for each of the plurality of input commands, wherein each image is generated by capturing the respective action and result;

displaying the generated images in an ordered time-based manner, wherein the order of each of the images corresponds to the generated confidence value of its assigned possible input commands; and selecting one of the plurality of possible input commands corresponding to the displayed images in response to a second input signal comprising additional speech from the user.

12. A non-transitory computer-readable recording medium that stores therein a computer program product, which, when executed by a processor, causes the method according to claim 11 to be performed.

* * * * *